United States Patent
Flockhart et al.

(10) Patent No.: US 6,678,371 B1
(45) Date of Patent: Jan. 13, 2004

(54) DIRECT CUSTOMER CONTROL OF A NETWORK ROUTER

(75) Inventors: Andrew D. Flockhart, Thornton, CO (US); Eugene P. Mathews, Barrington, IL (US)

(73) Assignee: Avaya Technolocy Corp., Basking Ridge, NJ (US)

( * ) Notice: Subject to any disclaimer, the term of this patent is extended or adjusted under 35 U.S.C. 154(b) by 0 days.

(21) Appl. No.: 09/504,139

(22) Filed: Feb. 15, 2000

(51) Int. Cl.[7] .......................... H04M 3/00; H04M 5/00; H04M 7/00

(52) U.S. Cl. ................... 379/265.02; 379/219

(58) Field of Search .................. 379/265.02, 265.03, 379/265.1, 265.11–265.13, 219

(56) References Cited

U.S. PATENT DOCUMENTS

| | | | |
|---|---|---|---|
| 4,737,983 A | 4/1988 | Frauenthal et al. | 379/221 |
| RE34,529 E | 2/1994 | Bicknell | 379/220 |
| 5,291,550 A | 3/1994 | Levy et al. | 379/242 |
| 5,335,268 A | 8/1994 | Kelly, Jr. et al. | 379/112 |
| 5,452,350 A * | 9/1995 | Reynolds et al. | 379/221.07 |
| 5,530,744 A | 6/1996 | Charalambous et al. | 379/265 |
| 5,553,133 A | 9/1996 | Perkins | 379/265 |
| 5,570,419 A | 10/1996 | Cave | 379/216 |
| 5,799,077 A | 8/1998 | Yoshii | 379/309 |
| 5,802,161 A | 9/1998 | Svoronos | 379/216 |
| 5,815,566 A | 9/1998 | Raamot | 379/265 |
| 5,878,130 A | 3/1999 | Andrews et al. | 379/265 |
| 5,926,528 A | 7/1999 | David | 379/113 |
| 6,327,364 B1 * | 12/2001 | Shaffer et al. | 379/265.02 |

FOREIGN PATENT DOCUMENTS

EP 0863650 9/1998 ............ H04M/3/50

OTHER PUBLICATIONS

GeoTel, *Network Intelligent CallRouter*™, Sep. 24, 1999, pp. 1–7; http://www.geotel.com/solutions/nicr/default.htm.
GeoTel, *Intelligent CallRouter*™, Sep. 24, 1999, pp. 1–7; http://www.geotel.com/solutions/icr/default.htm.
GeoTel, Site ICR™, Sep. 24, 1999, pp. 1–6; http://www.geotel.com/solutions/sicr/default.htm.
GeoTel, Intelligent CallRouter, Network Interfaces, Overview, 3 pages, undated.
GeoTel, Product Description, AT&T Network Interface Controller (ATTNIC), 2 pages (1 sheet), undated.
GeoTel, Product Description, MCI Network Interface Controller (MCI NIC), 2 pages (1 sheet), undated.
GeoTel, Product Description, Sprint Network Interface Controller (RPNIC), 2 pages (1 sheet), undated.
GeoTel, Intelligent CallRouter, Example Call Flow, 1 page, undated.

* cited by examiner

Primary Examiner—Benny Tieu
(74) Attorney, Agent, or Firm—David Volejnicek

(57) ABSTRACT

An entity of a private communications network (24, 26, 28), such as a controller (70) of an ACD system (24), controls the operation of a network router (30) of a public communications network (12, 14, 16), thereby eliminating the need in a network-routing system to send sensitive event or status information of the private network to the network router. The entity collects and processes locally the status information about the private network, and whenever it detects (704) that the workload balance in the private network needs readjusting, it sends (710) a new routing sequence message to the network router. These messages specify the routing scheme to the network router. A routing sequence message contains a pair (404, 406) of routing sequences. Each is an ordered sequence of destination route points (408). The first establishes a load balance and the second maintains the load balance. The first is executed by the network router once upon receipt, and the second is executed repeatedly in a cycle until a new routing sequence message is received.

41 Claims, 6 Drawing Sheets

DIRECT CUSTOMER CONTROL OF A NETWORK ROUTER

TECHNICAL FIELD

This invention relates to communications systems in general, and to routing of communications in such systems in particular.

BACKGROUND OF THE INVENTION

Systems for routing communications through communications networks are well known. They generally take one of two forms: premises routing and network routing. Premises routing involves making routing decisions in a private network once a communication has been delivered to that network. It is exemplified by private branch exchange (PBX)-based automatic call distribution (ACD) systems. Conventional ACD systems route calls (and more recently other communications as well) to agents in telemarketing and service-inquiry centers, and provide call-management, status-reporting, and performance-reporting capabilities. Network routing involves making routing decisions in a public network, for example, in an interexchange carrier's telephony network, prior to delivery of the communication to a premises destination, generally in a way that balances the workload across a plurality of destinations, e.g., ACDs. It is exemplified by, e.g., the routing system disclosed in U.S. Pat. No. 5,878,130.

Network routing systems generally operate by transporting large volumes of status and event data from the premises destinations, e.g., the ACDs, to a network router that is responsible for making the routing decisions and which uses that data to make those decisions. This data is generally very sensitive and proprietary to the sources of this information, i.e., to the private networks that are customers of the network routing systems. The customers that purchase network routing services are very reluctant to have this sensitive data passed to systems outside of their premises, because if a router is not under complete control of the customer, there is a security concern that this sensitive information may be leaked or misused.

SUMMARY OF THE INVENTION

This invention is directed to solving these problems and disadvantages of the prior art. Generally, the invention eliminates the need in a network-routing system to send sensitive event or status information to the network router. Rather, either one of the customer's ACDs or another communications entity of the customer collects and processes the information locally, under the customer's control or on the customer's premises, and whenever it detects that the load balance needs readjusting, it sends routing sequence messages to the network router. These messages specify, dictate, the routing scheme to the network router, whereby the customer exerts direct control over the network router. Illustratively, a routing sequence message contains a pair of routing sequences. Each is an ordered sequence of destination route points. The first is intended to establish a work load (communications processing) balance, and the second is intended to maintain the load balance. The first is executed once upon receipt by the network router, and the second is executed repeatedly in a cycle until a new routing sequence message is received. For example, assume a customer who has two ACDs A and B. Presently, A's queue delay is 20 seconds and it can handle one call every five seconds, while B's queue delay is 35 seconds and it can handle one call every ten seconds. The routing sequence message that would be sent to the network router in this example is "AAA,ABA" where the comma separates the two routing sequences of the pair.

Specifically according to one aspect of the invention, an apparatus comprises a communications network, a communications entity—for example, a private network or an automatic communication distribution (ACD) system—connected to the network for processing communications, and a network router connected to the network and responsive to information received from the entity for routing the communications to or from the entity over ones of a plurality of routes through the network. The entity determines its own status, selects ones of the routes based on that status, and specifies the selected routes to the network router to cause the router to route the communications over the specified routes. The network router in turn responds to the specification by routing the communications through the network over the specified routes. Illustratively, the entity comprises a plurality of communications endpoints—for example, a plurality of ACD systems, or a plurality of communications call-processing resources such as agents—the entity determines the status of the endpoints, selects ones of the endpoints—and preferably selects a sequence of the ones of the endpoints—to or from which the communications should be routed, and specifies the selected endpoints or the sequence thereof to the network router to cause the network router to route the communications over routes to or from the specified endpoints, preferably in the specified sequence. The network router in turn responds to the specified endpoints, or specified sequence thereof, by routing the communications through the network to or from the specified endpoints, in the specified sequence.

According to another aspect of the invention, a communications entity for use with a communications network that has a network router connected to the network for routing communications to or from the entity over ones of a plurality of routes through the network processes communications routed thereto or therefrom by the router, determines the status of the processing, selects ones of the routes based on the status, and specifies the selected routes to the network router to cause the network router to route the communications to or from the entity over the specified routes.

According to yet another aspect of the invention, a router for a communications network that has a communications entity connected thereto for processing communications receives from the entity a specification of ones of a plurality of routes to or from the entity through the network, and responds thereto by routing communications through the network to or from the entity over the specified ones of the routes.

Since only route specifications (e.g., sequences of destination route points) are passed to the network router, the possibility of a security breach of sensitive data in the network is eliminated. Also, the volume of data that is passed to the network router is dramatically reduced. Additional advantages are that it is no longer necessary to administer route destinations at the network router, that route points can be changed or added without needing to change the network router, that even a simple communications interface enables the network router to receive the routing sequence messages, and that messaging needs are greatly reduced.

While the invention has been characterized in terms of function, it encompasses both method that implements the function and apparatus that performs the function. The apparatus preferably includes an effector—any entity that effects the corresponding function step, unlike a means—for each function step. The invention further encompasses a computer-readable medium containing instructions which, when executed in a computer, cause the computer to perform the function steps.

These and other features and advantages of the present invention will become apparent from the following description of an illustrative embodiment of the invention taken together with the drawing.

DETAILED DESCRIPTION

Figure 1:
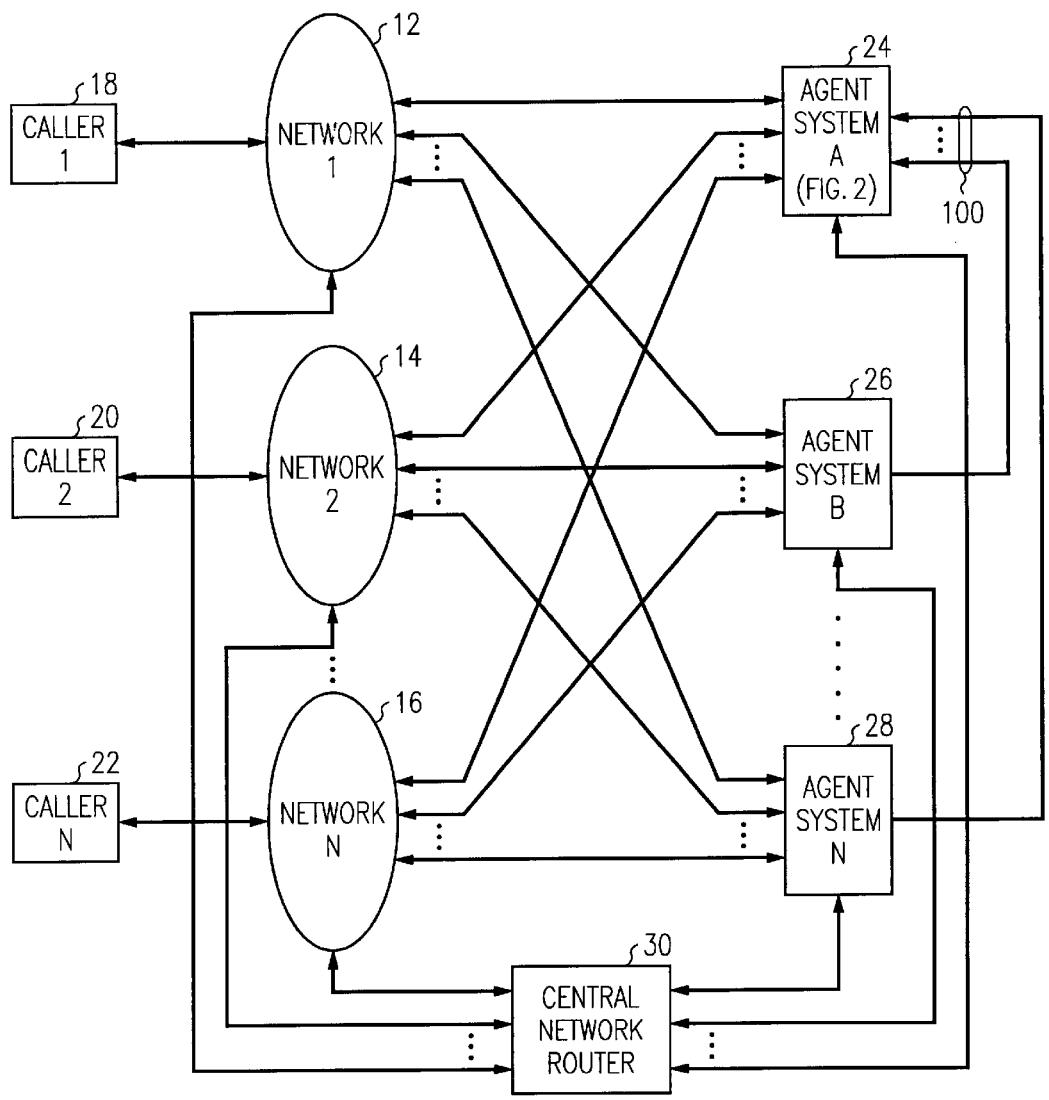
FIG. 1 is a block diagram of a network of networks that includes an illustrative embodiment of the invention.

FIG. 1 shows an illustrative example of a network 10 of communications networks in which the invention may be advantageously implemented. Network of networks 10 comprises one or more communications networks 12, 14, 16, such as the public telephone networks of different carriers and/or the Internet data network, each one of which serve one or more callers 18, 20, 22. The term "caller" is used generically herein to refer to any person or entity that can initiate or receive a communication. Network of networks 10 also comprises one or more communication entities for processing communications. In this embodiment, the entities are agent systems 24, 26, 28, such as automatic communications distribution networks (ACDs), or different private networks each one of which may comprise one or more ACDs. Any individual network 12, 14, 16 and agent system 24, 26, 28 may communicate in any one or more media, such as telephony voice, fax, electronic mail, data and voice messaging, video, etc. Each agent system 24, 26, 28 constitutes one or more communications endpoints. Networks 12, 14, 16 and agent systems 24, 26, 28 are interconnected with each other in a conventional manner. Additionally, network of networks 10 includes one or more central network routers 30 that are connected to networks 12, 14, 16 and agent systems 24, 26, 28 and that generate control signals for controlling routing of communications through networks 12, 14, 16 to, and even through, systems 24, 26, 28, depending upon whether central network router 30 sees each system 24, 26, 28 as a single communication endpoint or a plurality of communication endpoints. Each network 12, 14, 16 is configured such that, when it receives a request for a communications connection to one of agent systems 24, 26, 28, it forwards the request to central network router 30.

Central network router 30 then processes the request and controls network of networks 10 to effect a route through network of networks 10 that optimally utilizes network of networks 10. As described so far, network of networks 10 is conventional. For example, it may be the communications system which is described in U.S. Pat. No. 5,878,130.

Contrary to the prior art, central network router 30 does not perform its routing functions based upon raw data supplied by agent systems 24, 26, 28. Rather, according to the invention, one or more agent systems 24, 26, 28 collects this data from one or more of the other agent systems, and then uses the data to determine their status and make routing decisions on the basis thereof that are made in the prior art by central network router 30. The collecting agent system then commands central network router 30 to implement those decisions by generating and sending to central network router 30 the requisite control signals. Thus the collecting agent system specifies, dictates, to central network router 30 which routes through network of networks 10 to route communications over.

Figure 2:
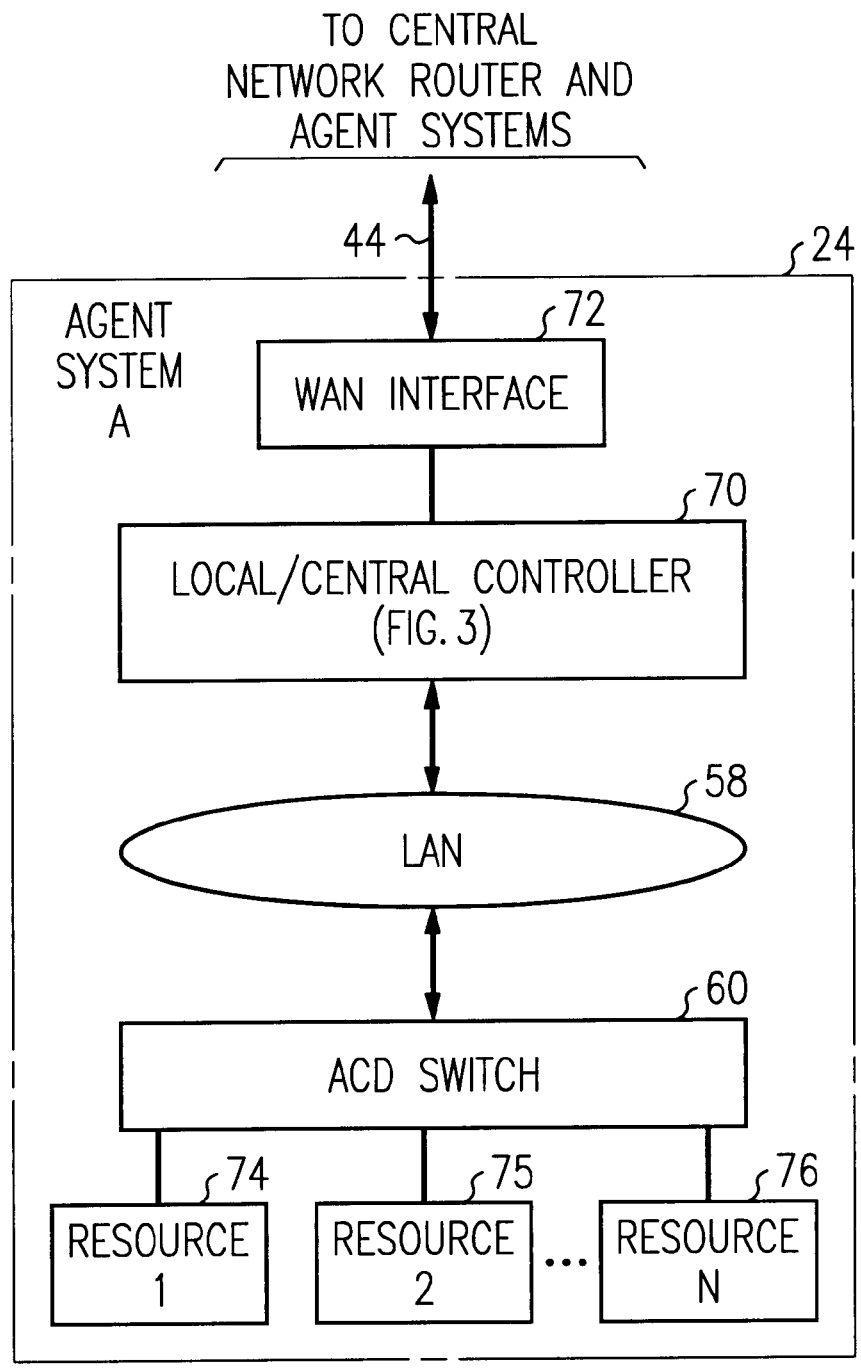
FIG. 2 is a block diagram of an agent system of the network of networks of FIG. 1.

Let us assume an illustrative embodiment of the invention wherein one agent system 24 acts as a controller of central network router 30 on behalf of all agent systems 24, 26, 28. Agent system 24 is connected to other agent systems 26, 28 by communications links 100 via which other agent systems 26, 28 send it conventional data about their status. A block diagram of agent system 24 is shown in FIG. 2. Agent system 24 is connected by a control communications medium, such as a wide area network (WAN) 44, to central network router 30 and agent systems 26, 28. (WAN 44 subsumes links 100. Alternatively, agent system 24 may have separate control communications links 100 connecting it to agent systems 26, 28 and to central network router 30). Accordingly, agent system 24 includes a WAN interface 72 for connecting to WAN 44 so as to permit transfer of status signals from agent systems 26, 28 to agent system 24 and transfer of control signals from agent system 24 to central network router 30. WAN interface 72 connects the signals to and from a local/central controller 70 of agent system 24, which uses the status signals to generate the control signals. Aside from controlling central network router 30, controller 70 also controls the other portions of agent system 24 and collects status information from these portions. These portions include a plurality of resources 74–76, such as call center agents, interactive voice response systems, automated fax mailer, etc., and an ACD switch 60 that distributes communications to resources 74–76 for service. Resources 74–76 are generally the destinations of communications routed to agent system 24. Controller 70 is communicatively connected to ACD switch 60 and to resources 74–76 by a local area network (LAN) 58. Except for controlling central network router 30, agent system 24 is conventional.

Figure 3:
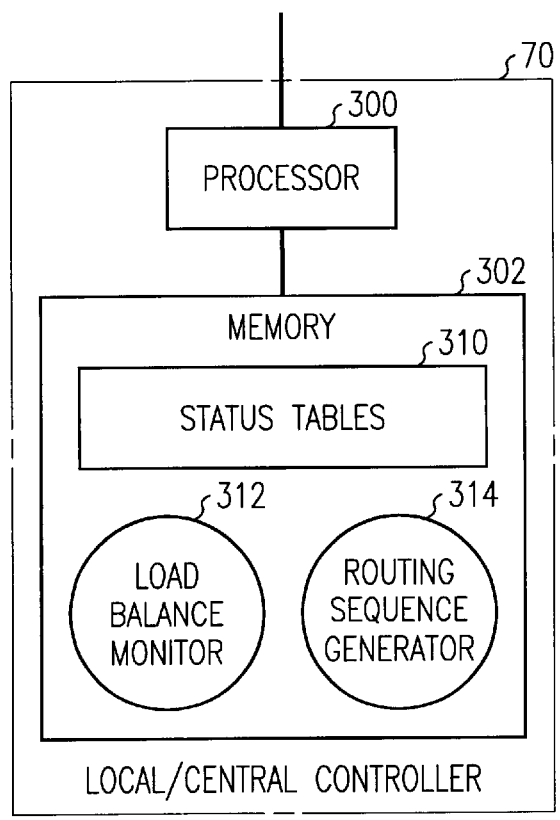
FIG. 3 is a block diagram of a local/central controller of the agent system of FIG. 2.
Figure 7:
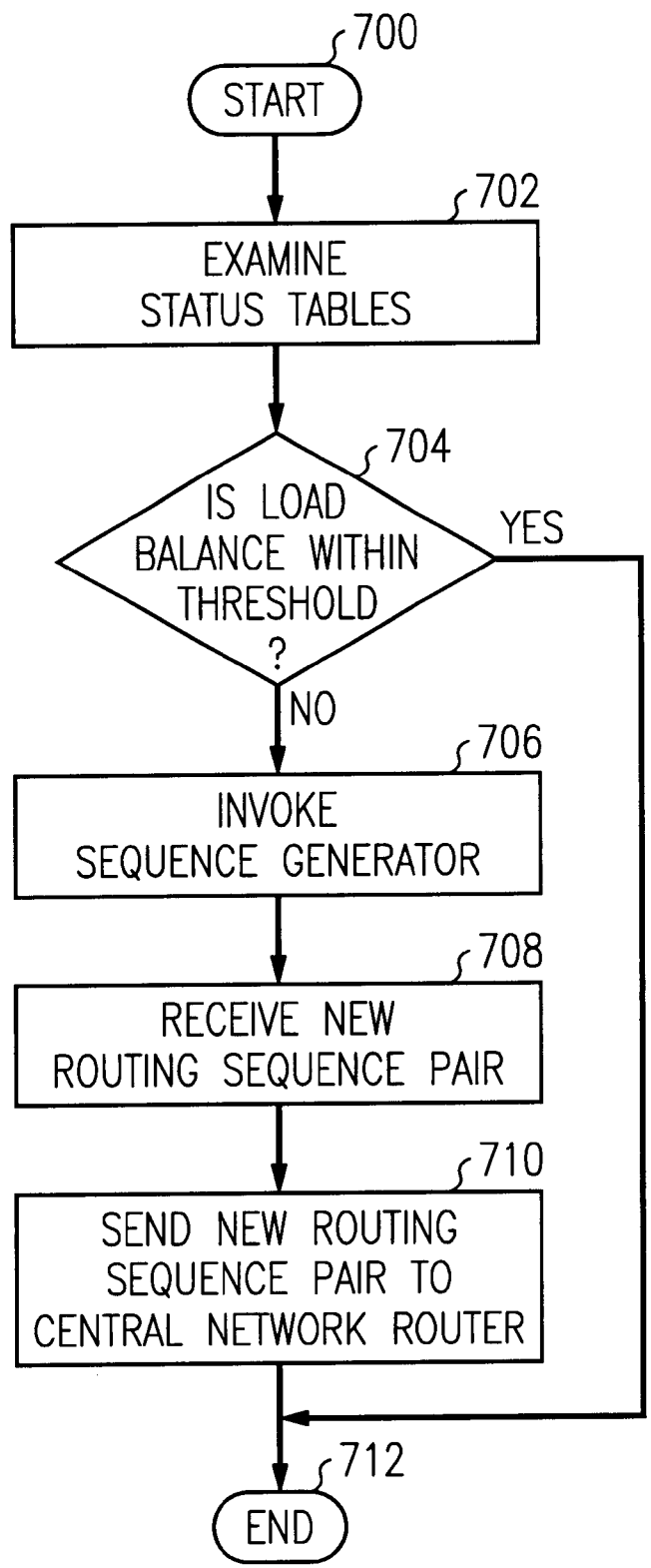
FIG. 7 is a functional flow diagram of a load-balance monitoring function of the controller of FIG. 3.
Figure 8:
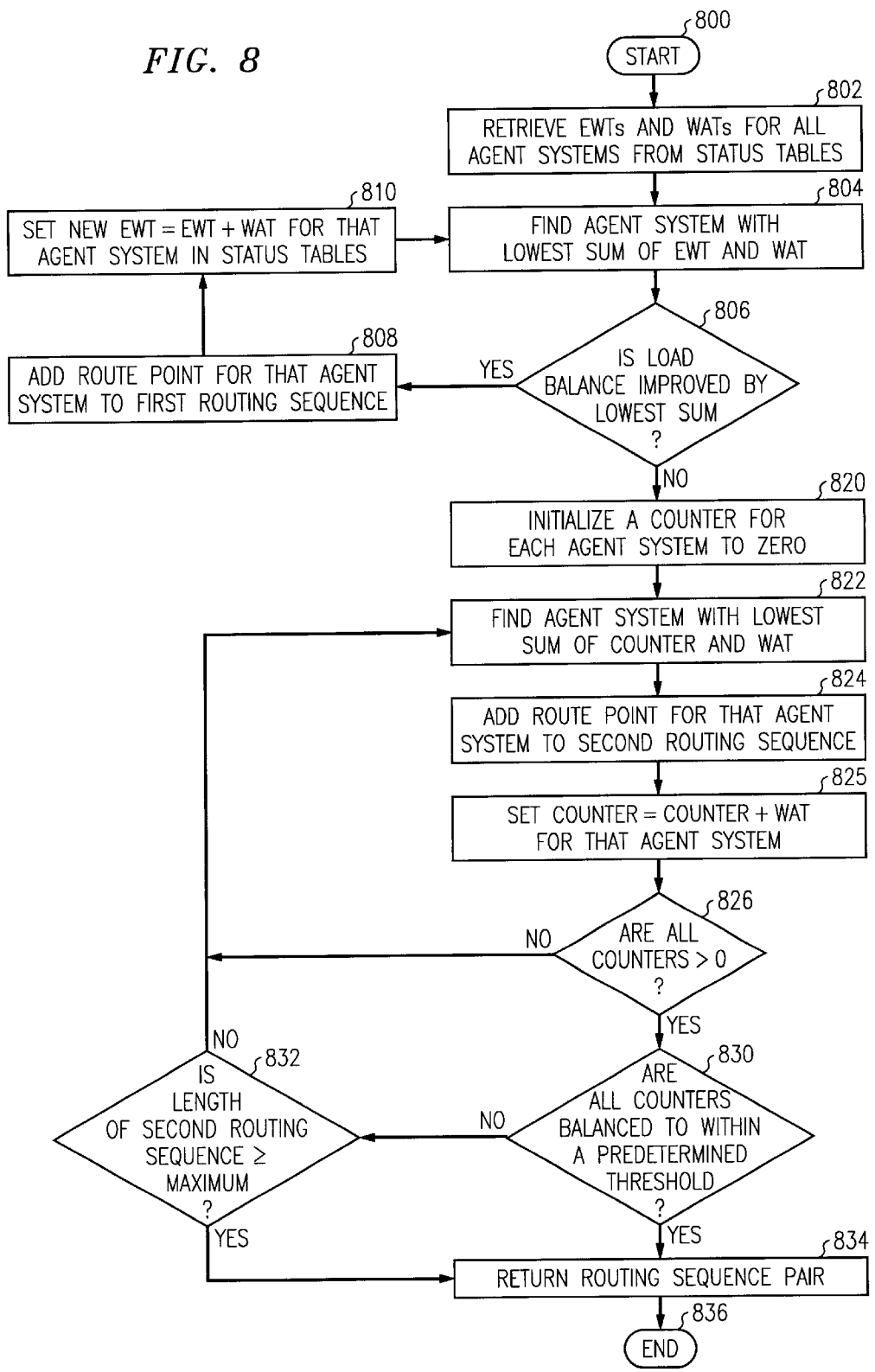
FIG. 8 is a functional flow diagram of a routing-sequence generating function of the controller of FIG. 3.

FIG. 3 shows an illustrative example of the structure of local/central controller 70. Controller 70 is illustratively a stored-program-controlled machine that comprises a processor 300 for executing programs and a memory 302 that stores programs for execution by processor 300 and data for use by processor 300 in executing the programs. Aside from conventional programs and data that controller 70 needs to function as a local controller for agent system 24, memory 302 includes status tables 310, a load-balance monitor 312, and a sequence generator 314, which controller 70 needs to function as a central controller of central network router 30. Status tables 310 store status data on each one of agent systems 24, 26, 28. The functions of load-balance monitor 312 and sequence generator 314 are shown in FIGS. 7 and 8, respectively, and are described further below.

Figure 4:
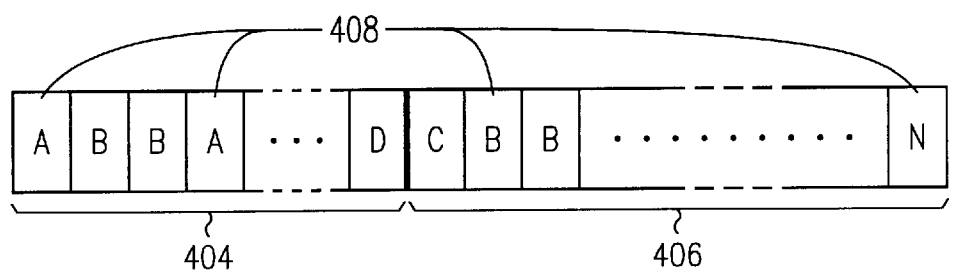
FIG. 4 is a block diagram of a routing-sequence pair generated by the controller of FIG. 3 and used by a central router of the network of networks of FIG. 1.

Controller 70 controls central network router 30 by sending it a pair of routing sequences 404, 406, shown in FIG. 4, which central network router 30 follows. Each sequence 404, 406 comprises one or more route points 408, each one of which identifies one of the agent systems 24, 26, 28, and specifies to central network router 30 the one of the agent systems to which router 30 should route the next communication that is destined for these agent systems. First sequence 404 establishes a balance between the workloads of agent systems 24, 26, 28, and second sequence 406 maintains that balance. First sequence 404 is traversed (followed) once, upon receipt by central network router 30. Second sequence 406 is traversed repeatedly by central network router 30 until receipt of a new pair of sequences 404, 406.

Figure 5:
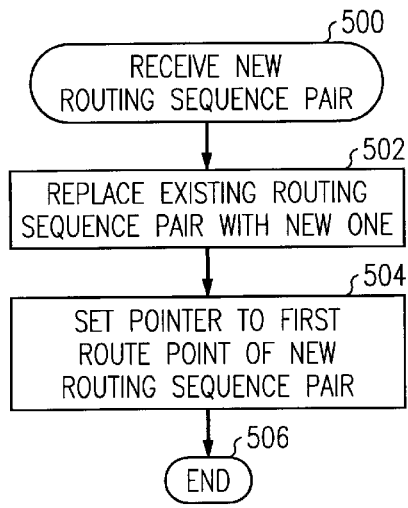
FIG. 5 is a functional flow diagram of a routing-sequence update function of the central router of the network of networks of FIG. 1.

When central network router 30 receives a routing-sequence pair 404, 406 from an agent system 24, at step 500 of FIG. 5, it finds any existing routing-sequence pair 404, 406 that it has from this agent system 24 and replaces it with the new one, at step 502. Central network router 30 then sets a pointer to the first route point 408 of this new routing-sequence pair 404, 406, at step 504, and ends this operation, at step 506.

Figure 6:
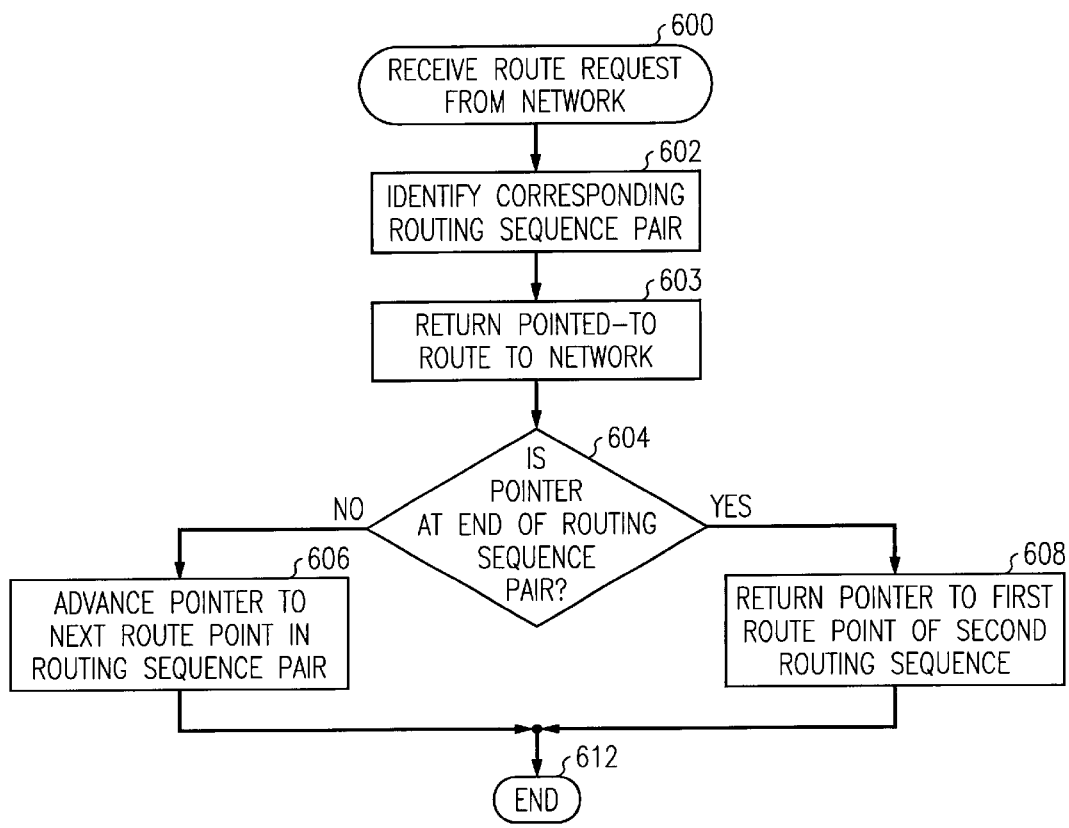
FIG. 6 is a functional flow diagram of a communications-routing function of the central router of the network of networks of FIG. 1.

When a new communication is initiated in one of the networks 12, 14, 16, that network performs conventional address translation and segmentation of the address of the communication, and based on the results thereof sends a route request to central network router 30. Upon receipt of this route request, at step 600 of FIG. 6, central network router 30 determines which agent system 24, 26, 28 or set of agent systems the communication is destined for and identifies its corresponding routing-sequence pair 404, 406, at step 602. If central network router 30 is serving only one set of agent systems 24, 26, 28, it has only one routing-sequence pair 404, 406, and step 602 may therefore be skipped. Central network router 30 then returns the route that corresponds to the route point 408 pointed-to by its pointer to the requesting network 12, 14, 16, at step 603. Central network router 30 then checks if its pointer is pointing to the end of the identified routing-sequence pair 404, 406, at step 604. If not, central network router 30 advances the pointer to the next route point 408 in the routing-sequence pair 404, 406, at step 606; if so, central network router 30 returns the pointer to the first route point 408 of the second sequence 406 of the pair routing-sequence pair 404, 406, at step 608. Following step 606 or 608, central network router 30 ends its operation, at step 612. The requesting network uses the returned route to route the communication to its destination, in a conventional manner.

Load-balance monitor 312 (see FIG. 3) may be invoked either each time that controller 70 receives a status message, or periodically. Upon its invocation, at step 700 of FIG. 7, monitor 312 examines status tables 310, at step 702, to determine, at step 704, if the load-balance of communications being handled by individual ones of agent systems 24, 26, 28 is within a predetermined threshold. This will usually involve determining whether or not the wait times at each of the agent systems 24, 26, 28 are substantially the same. However, the determination may be made in any desired way; for example, it may involve determining whether the number of communications handled by an agent system is within a specified percentage of communications handled by the other agent systems, or whether the resource occupancy rates of resources 74–76 of one agent system are within a specified percentage of occupancy rates of the resources on the other agent systems. If the load-balance is within the predetermined threshold, monitor 312 ends its operation, at step 712. If the load-balance falls below the predetermined threshold, monitor 312 invokes sequence generator 314, at step 706, to compute a new routing-sequence pair 404, 406, and upon receipt of the new routing-sequence pair 404, 406 from sequence generator 314, at step 708, sends the pair to central network router 30, at step 710. Monitor 312 then ends its operation, at step 712.

Upon its invocation by load-balance monitor 312, at step 800 of FIG. 8, sequence generator 314 retrieves estimated wait times (EWTs) and either advance times or preferably weighted advance times (WATS) for all agent systems 24, 26, 28 from status tables 310, at step 802. EWTs and WATs are conventional data items, for example, those described in U.S. Pat. No. 5,506,898. Then, for each agent system 24, 26, 28, generator 314 sums its EWT and WAT to determine which agent system 24, 26, 28 has the lowest sum, at step 804. Using that sum as that agent system's new EWT, generator 314 uses the same criteria as load-balance monitor 312 did at step 704 of FIG. 7 to determine if the load balance is improved thereby, at step 806. If yes, then generator 314 adds a route-point 408 for that agent system 24, 26, 28 to a first routing sequence 404, at step 808, sets that agent system's EWT in status tables 310 to the EWT+WAT sum, at step 810, and returns to step 806. This process is repeated until generator 314 determines at step 806 that a lowest new EWT determined at step 804 does not improve the load balance. This completes generation of first routing sequence 404, and generator 314 proceeds to steps 820 et seq. to generate second routing sequence 406.

At step 820, generator 314 initializes to zero a counter for each agent system 24, 26, 28. Then, for each agent system 24, 26, 28, generator 314 sums its counter value and WAT to determine which agent system 24, 26, 28 has the lowest sum, at step 822, and adds a route point 408 for that agent system 24, 26, 28 to second routing sequence 406, at step 824. Generator 314 also sets that agent system's counter to the sum of the counter value and WAT, at step 825. Each counter thus indicates the total wait time added to the corresponding agent system in second routing sequence 406, that is, how many times the corresponding agent system appears in second routing sequence 406 multiplied by the WAT. Generator 314 then checks whether all counters have values greater than zero, at step 826. If not, generator 314 returns to step 822. If and when it determines at step 826 that all counter values are greater than zero, generator 314 checks whether the values of all counters are balanced to within a predetermined threshold, at step 830. If not, generator 314 checks if the length of second routing sequence 406 exceeds a predetermined maximum length, at step 832. If not, generator 314 proceeds to step 822; if so, or if all counters are found to be balanced at step 830, generator 314 returns the generated routing-sequence pair 404, 406 to monitor 312, at step 834, and ends its operation, at step 836.

Of course, various changes and modifications to the illustrative embodiment described above will be apparent to those skilled in the art. For example, the invention may be used in many other load-balancing applications, such as load-balancing of page requests across a cluster of Web servers, load-balancing of work items across a network or cluster of workflow engines, or assigning channels from a group of transmission links. Such changes and modifications can be made without departing from the spirit and the scope of the invention and without diminishing its attendant advantages. It is therefore intended that such changes and modifications be covered by the following claims except insofar as limited by the prior art.

What is claimed is:

1. An apparatus comprising:
a communications network;
a communications entity connected to the network for processing communications and comprising
means for determining a status of the entity,
means responsive to the determined status, for selecting ones of a plurality of routes to or from the entity, and
means responsive to the selecting means, for specifying the selected routes to a network router to cause the network router to route the communications over the specified routes; and
the network router, connected to the network and responsive to the specification from the entity, for routing through the network over the specified routes communications received in the network subsequently to the specifying of the selected routes to the network router.

2. The apparatus of claim 1 wherein:
the entity comprises a plurality of communications endpoints;
the determining means determine status of the plurality of endpoints;
the selecting means select ones of the endpoints to or from which the communications should be routed; and
the specifying means specify the selected endpoints to the network router to cause the network router to route the communications over routes to or from the specified endpoints.

3. The apparatus of claim 2 wherein:
the selecting means select a sequence of ones of the endpoints in which sequence the communications are to be routed to or from the ones of the endpoints.

4. The apparatus of claim 3 wherein:
the selecting means select a new said sequence and the specifying means specify the new sequence to the network router whenever a balance between the endpoints falls below a predetermined threshold.

5. The apparatus of claim 3 wherein:
the selecting means select a first said sequence to establish a balance between the endpoints and select a second said sequence to maintain the balance established by the first sequence.

6. The apparatus of claim 5 wherein:
the selecting means select a new said first sequence and a new said second sequence whenever a communications load balance between the endpoints falls below a predetermined threshold.

7. The apparatus of claim 5 wherein:
the router routes the communications once according to the first sequence, and routes the communications repeatedly according to the second sequence.

8. The apparatus of claim 7 wherein:
the selecting means comprise
means responsive to the balance between the endpoints falling below a predetermined threshold, for repeatedly determining an endpoint whose sum of its estimated wait time and its advance time is lowest among the endpoints and improves the balance between the endpoints, and including each said determined endpoint in a new said first sequence, and further repeatedly determining an endpoint whose product of its advance time and a number of times that said endpoint appears in a new said second sequence is lowest among the endpoints, and including each said determined endpoint in the new second sequence until each endpoint appears at least once in the new second sequence.

9. The apparatus of claim 8 wherein:
the selecting means further include each said determined endpoint in the new second sequence until at least one of (a) the products of all the endpoints become balanced to within a predetermined threshold and (b) a length of the second sequence reaches a predetermined maximum length.

10. The apparatus of claim 1 wherein:
the network is a public communications network; and
the entity comprises a private communications network.

11. The apparatus of claim 10 wherein:
the determining means comprises a controller of the private communications network.

12. The apparatus of claim 10 wherein:
the private communications network comprises at least one automatic communications distribution (ACD) system.

13. The apparatus of claim 12 wherein:
the determining means comprise a controller of the ACD system.

14. The apparatus of claim 1 wherein:
the entity comprises a destination of communications received through the network.

15. The apparatus of claim 2 wherein:
the endpoints comprise a plurality of communications destinations.

16. A communications entity for use with a communications network that has a network router connected to the network for routing communications to or from the entity over ones of a plurality of routes through the network, the entity comprising:
means connected to the network for processing communications routed to or from the entity by the router;
means coupled to the processing means for determining a status of the processing means;
means coupled to the determining means and responsive to the determined status for selecting ones of the routes to or from the entity; and
means coupled to the selecting means and responsive to the selection for specifying the selected routes to the network router to cause the network router to route to or from the entity over the specified routes communications received in the network subsequently to the specifying of the selected routes to the network router.

17. The communications entity of claim 16 wherein:
the processing means comprise a plurality of communications endpoints;
the determining means determine status of the plurality of endpoints;
the selecting means select ones of the endpoints to or from which the communications should be routed; and
the specifying means specify the selected endpoints to the network router to cause the network router to route the communications over routes to or from the specified endpoints.

18. The communications entity of claim 17 wherein:
the selecting means select a sequence of ones of the endpoints in which sequence the communications are to be routed to or from the ones of the endpoints.

19. The communications entity of claim 18 wherein:
the selecting means select a new said sequence and the specifying means specify the new sequence to the network router whenever a balance between the endpoints falls below a predetermined threshold.

20. The communications entity of claim 18 wherein:
the selecting means select a first said sequence to establish a balance between the endpoints and select a second said sequence to maintain the balance established by the first sequence.

21. The communications entity of claim 20 wherein:
the selecting means select a new said first sequence and a new said second sequence whenever a communications load balance between the endpoints falls below a predetermined threshold.

22. The communications entity of claim 20 wherein:
the specifying means cause the network router to route the communications once according to the first sequence and to route the communications repeatedly according to the second sequence.

23. The communications entity of claim 22 wherein:
the selecting means comprise
means responsive to the balance between the endpoints falling below a predetermined threshold, for repeatedly determining an endpoint whose sum of its estimated wait time and its advance time is lowest among the endpoints and improves the balance between the endpoints, and including each said determined endpoint in a new said first sequence, and further repeatedly determining an endpoint whose product of its advance time and a number of times that said endpoint appears in a new said second sequence is lowest among the endpoints, and including each said determined endpoint in the new second sequence until each endpoint appears at least once in the new second sequence.

24. The communications entity of claim 23 wherein:
the selecting means further include each said determined endpoint in the new second sequence until at least one of (a) the products of all the endpoints become balanced to within a predetermined threshold and (b) a length of the second sequence reaches a predetermined maximum length.

25. The communications entity of claim 16 for use with a public communications network, wherein:
the communications entity comprises a private communications network.

26. The communications entity of claim 25 wherein:
the determining means comprise a controller of the private communications network.

27. The communications entity of claim 25 wherein:
the private communications network comprises at least one automatic communications distribution (ACD) system.

28. The communications entity of claim 27 wherein:
the determining means comprise a controller of the ACD system.

29. The communications entity of claim 16 wherein:
the processing means comprise a destination of communications received through the network.

30. The communications entity of claim 17 wherein:
the endpoints comprise a plurality of communications destinations.

31. A router for a communications network that has a communications entity connected to the network for processing communications, the router comprising:
means for receiving from the entity a specification of ones of a plurality of routes through the network to or from the entity; and means responsive to receipt of the specification for routing through the network to or from the entity over the specified ones of the routes communications received in the network subsequently to the specifying of the selected routes to the network router.

32. The router of claim 31 wherein:
the receiving means receive from the entity a specification of ones of a plurality of communications endpoints of the entity; and
the routing means respond to receipt of the specification of the endpoints by routing communications through the network over routes to or from the specified endpoints.

33. The router of claim 32 wherein:
the receiving means receive from the entity a specification of a sequence of the ones of the endpoints; and
the routing means respond to receipt of the specification of the sequence by routing communications through the network over routes to or from the specified endpoints in the specified sequence.

34. The router of claim 33 wherein:
the receiving means receive a first said sequence for the routing means to establish a balance between the endpoints and receive a second said sequence for the routing means to maintain the balance established by the first sequence.

35. The router of claim 34 wherein:
the routing means route the communications once according to the first sequence and route the communications repeatedly according to the second sequence.

36. The router of claim 31 for a public communications network that has an entity comprising a private communications network connected thereto, wherein:
the receiving means receive the specification from the private network, and
the routing means route the communications through the public network to or from the private network.

37. The router of claim 36 wherein:
the receiving means receive the specification from an automatic communications distribution (ACD) system of the private network.

38. A method of routing communications in a communications network having a communications entity connected to the network for processing the communications and further having a network router connected to the network for routing the communications to or from the entity through the network, comprising:
the entity determining a status of the entity;
the entity selecting ones of a plurality of routes to or from the entity in response to the determined status;
the entity specifying the selected routes to the network router; and
the network router being responsive to the specifying by routing through the network to or from the entity over the specified routes communications received in the network subsequently to the specifying of the selected routes to the network router.

39. An apparatus comprising:
a communications network;
a communications entity connected to the network for processing communications and comprising
an effector of determining a status of the entity,
an effector, responsive to the determined status, of selecting ones of a plurality of routes to or from the entity, and an effector, responsive to the selection, of specifying the selected routes to a network router to cause the network router to route the communications over the specified routes; and the network router, connected to the network and responsive to the specification from the entity, for routing through the network over the specified routes communications received in the network subsequently to the specifying of the selected routes to the network router.

40. A communications entity for use with a communications network that has a network router connected to the network for routing communications to or from the entity over ones of a plurality of routes through the network, the entity comprising:

- an effector, connected to the network, of processing communications routed to or from the entity by the router;
- an effector, coupled to the effector of processing, of determining a status of the processing means;
- an effector, coupled to the effector of determining and responsive to the determined status, of selecting ones of the routes to or from the entity; and
- an effector, coupled to the effector of selecting and responsive to the selection, of specifying the selected routes to the network router to cause the network router to route to or from the entity over the specified routes communications received in the network subsequently to the specifying of the selected routes to the network router.

41. A router for a communications network that has a communications entity connected to the network for processing communications, the router comprising:

- an effector of receiving from the entity a specification of ones of a plurality of routes through the network to or from the entity; and
- an effector, responsive to receipt of the specification, of routing through the network to or from the entity over the specified ones of the routes communications received in the network subsequently to the specifying of the selected routes to the network router.

* * * * *